UNITED STATES PATENT OFFICE 2,444,655

ABRASION-RESISTANT POLYMERS AND PROCESS FOR PREPARING SAME

Edwin H. Kroeker, Cheltenham, and Willard J. Croxall, Bryn Athyn, Pa., assignors to Röhm & Haas Company, Philadelphia, Pa., a corporation of Delaware No Drawing. Application March 10, 1945, Serial No. 582,170

27 Claims. (Cl. 260—84)

This invention concerns a method for producing resinous bodies of high abrasion resistance by polymerizing acrylic type esters, the alcohol portion of which contains an ether linkage and an olefinic linkage. It also relates to the polymeric products which are thus obtained and which are characterized by good abrasion resistance, toughness, and relatively good flexural strength. It furthermore relates to copolymers prepared from the said esters with any ethenoid copolymerizable therewith, particularly methyl acrylate or methacrylate and ethyl acrylate or methacrylate.

Resinous materials prepared from polymerizable organic compounds have heretofore lacked the degree of abrasion resistance of inorganic materials. While the hardness of organic materials has been considerably improved in recent years, too often hardness and abrasion resistance have been increased at the expense of flexural strength and with a great increase in brittleness. For many applications, high resistance to abrasion and toughness are essential with retention of relatively good flexural strength. Such a combination is provided by this invention.

It has been found that resinous bodies having this favorable combination of properties are obtained by mixing a compound of the formula,

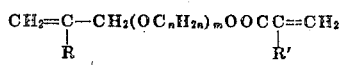

wherein R represents hydrogen or a methyl group, R' represents hydrogen or a methyl group, $C_nH_{2n}$ represents an alkylene chain of two carbon atoms between oxygen atoms in which $n$ represents an integer from two to three, inclusive, and $m$ represents an integer from one to two, inclusive, with a relatively heat-sensitive organic peroxide and with a relatively heat-stable peroxide, and heating the resulting mixture first at a temperature between about 25° C. and 75° C. until an insoluble, semi-rigid to rigid product results and then heating said product at a temperature from about 120° C. to about 180° C. until a tough, abrasion resistant product is formed.

The compounds which have been found to be effective when polymerized as just specified may be regarded as glycol derivatives in which one hydroxyl group is esterified with acrylic or methacrylic acid and the other hydroxyl group is etherified with an allyl or methallyl group. The glycol may be an ethylene or propylene glycol and contain, if desired, more than one alkenoxy group. The ethylene, propylene, diethylene, and dipropylene glycol nuclei are particularly suitable and are commercially available.

Allyl- or methallyl-oxyalkylene esters of acrylic or methacrylic acids may be prepared in a number of ways. One of the most satisfactory ways of obtaining the ether-alcohol portion of these esters is to start with allyl or methallyl alcohol and add one or more molecules of an alkylene oxide thereto. Thus allyl alcohol may be warmed in the presence of an acidic catalyst and treated with ethylene oxide until one mol has been taken up to yield allyloxyethanol. The same sort of reaction can be effected with propylene oxide to yield allyloxypropanol-2. A second mol of either alkylene oxide may be added to give allyloxyethoxyethanol, for example. Mixed alkylene groups may be introduced, as in allyloxyethoxypropanol-2 or allyloxypropoxyethanol. Methallyl alcohol may be used with the same effect as allyl alcohol.

The ether-alcohol may then be reacted with acrylic or methacrylic acid by conventional procedures. For example, the mixture of alcohol and acid may be refluxed in the presence of an esterification catalyst, such as sulfuric acid, in benzene or toluene and the water of esterification separated in a trap. On the other hand, the ether-alcohol may be used for transesterification of an ester of acrylic or methacrylic acid in the presence of catalysts such as sulfuric acid or sodium alcoholate. For example, methyl acrylate may be heated with one of the ether-alcohols with a little sulfuric acid and the methanol-methyl acrylate azeotrope taken off.

By such methods there may be prepared alloxyethyl acrylate, alloxyethyl methacrylate, methalloxyethyl acrylate, methalloxyethyl methacrylate, alloxypropyl acrylate, alloxypropyl methacrylate, alloxyethoxyethyl acrylate, alloxyethoxyethyl methacrylate, methalloxyethoxyethyl acrylate or methacrylate, methalloxyethoxypropyl acrylate or methacrylate, alloxypropoxyethyl acrylate or methacrylate, or the like.

These monomers may be polymerized alone, in mixtures with each other, or in admixture with other polymerizable ethenoids, such as the various esters of acrylic or methacrylic acid and an alcohol, such as methyl acrylate, methyl methacrylate, ethyl acrylate, or ethyl methacrylate, acrylic acid, methacrylic acid, acrylonitrile, methacrylonitrile, styrene, and various vinyl esters. The copolymers having a major proportion of the acrylic or methacrylic esters of allyl or methallyl monoethers of the short carbon chained glycols exhibit the peculiar properties due to these ether-alcohol esters to an extent sufficient to distinguish them over previously known polymers or copolymers. Copolymers may be prepared by the same method as used for the preparation of the acrylic esters of ether-alcohols, but, it may be noted, conditions for polymerization are somewhat less critical. These esters when present in a major proportion have a profound effect on the properties of any copolymer formed therewith.

Two types of catalysts are used in the preparation of the polymeric materials of this invention, one which is relatively heat-sensitive and which is effective as a polymerization catalyst below 100° C. and is relatively unstable in boiling toluene, and one which is relatively heat-stable, as determined by stability in boiling toluene, and which promotes polymerization above 100° C. It has been found essential that both types of catalysts be present and that conditions of reaction be used which permit both catalysts to be effective. Polymerization with a single type of catalyst fails to yield a resinous body having the desired properties and free from serious defects.

Typical of the more sensitive polymerizing catalysts are aromatic carboxylic peroxides such as benzoyl peroxide, phthaloyl peroxide, and naphthoyl peroxide, fatty acid peroxides such as acetyl peroxide, caproyl peroxide, lauroyl peroxide, and arylaliphatic carboxylic acid peroxides such as cinnamoyl peroxide, and mixed peroxides such as acetyl benzoyl peroxide. These peroxides decompose at least gradually in boiling toluene. Amounts of about 0.25% to about 5% of one or more of these catalysts may be used. It will be evident that a peroxide of relatively low molecular weight, such as acetyl peroxide, may be used in a lower amount by weight than a peroxide of higher molecular weight, such as lauroyl peroxide. The amount or proportion of catalyst required will also depend upon the temperature at which initial polymerization is effected and the time which is allotted for this step. Larger amounts of catalyst and higher temperatures, while speeding up the first stage, tend to produce color, which may be objectionable in cases where clear, transparent, essentially colorless objects are required, but which is not a critical factor where colored, semi-transparent, or opaque objects are being made. Initial polymerization may be effected at room temperature or slightly above such temperature over a time of ten to twenty-four hours. On the other hand, three hours at 65° to 70° C. provide ample time for formation of an insoluble gel. The most generally useful temperature range is from about 50° to about 65° C. for the primary stage.

Typical of the relatively heat-stable peroxides which are effective above 120° C. are di-tert.-butyl peroxide, tert.-butyl hydroperoxide, tetralin peroxide, 1-hydroxycyclohexyl hydroperoxide-1, urea peroxide, or other peroxides which are relatively stable in boiling toluene. These may be used in amounts of 0.5% to 5%, or more in some cases, on the weight of the monomer. The time required for the effective action of these catalysts on the initially polymerized products to convert them into bodies of good strength will vary from an hour or two at 170° to 180° C. to sixteen to twenty-four hours at 120° C. Flexural strength, broadly speaking, increases progressively with heating at 120° C. to 180° C. As might be expected, some color may develop on prolonged heating, particularly at the higher temperatures. The temperature range of 135° to 150° C. is generally satisfactory for development of good abrasion resistance and strength without appreciable development of color in this stage of curing.

After the mixing of monomeric acrylic esters and the two types of catalysts has been carried out, the resulting mixture is poured into a mold and heated as described, first at a lower temperature and then at a higher temperature. Molds are conveniently made of glass, or other ceramic material, metals, or even plaster of Paris. Flat sheets may be formed between two polished glass surfaces which impart a smooth finish to the cast object. The final product may be cut and machined, if required. It has been found, however, that such operations are performed with greater facility with the product resulting from the initial polymerization. At this time cutting, machining, carving, or the like, may be readily performed and the shaped object may then be heated at 120° to 180° C. When an object is being molded to a set shape, the initial reaction may be carried out in a suitable mold, which may then be removed and the final polymerization performed without a mold.

Further details of the preparation of the polymeric materials of this invention are given in the following illustrative examples.

Example 1

One hundred parts of alloxyethyl methacrylate, three parts of tert.-butyl hydroperoxide, and one part of benzoyl peroxide were mixed and warmed to about 50° C. to dissolve the benzoyl peroxide. The mixture was then poured into molds and placed in an oven at 60° C. for three and one-half hours. The molds were then taken from the oven and immersed in water at 60° C. Steam was passed into the water bath until the water boiled, and it was maintained at a gentle boil for about an hour. At the end of this time, the partial polymer, in the form of a firm gel, was separated from the molds by gentle, steady pressure. At this stage in the polymerization, the sheets were firm and somewhat flexible and could readily be sawed, cut, ground, or machined. The partial polymer was then returned to the oven and warmed to 125° C. during the course of one hour and was kept at 125° C. for sixteen hours and then heated for three hours more at 140° C. The polymer showed the following physical properties: It had a heat distortion temperature of more than 110° C., gave a Taber wiping abrasion test of fifty to sixty times that of polymethyl methacrylate, and had a flexural strength (A. S. T. M. D–48–39) of 5500 p. s. i.

Example 2

Eighty-five parts of alloxyethyl methacrylate, fifteen parts of methyl methacrylate, three parts of tert.-butyl hydroperoxide, and one part of benzoyl peroxide were mixed and polymerized as described in Example 1. The polymer showed the following physical properties: It had a heat distortion temperature of more than 110° C., gave a Taber wiping abrasion test of fourteen to eighteen times that of polymethyl methacrylate and a Charpy impact strength, unnotched (A. S. T. M. D–256–41–T) of 1.11 ft. lbs., and had a flexural strength (A. S. T. M. D–48–39) of 9100 p. s. i.

Example 3

Sixty parts of alloxyethyl methacrylate, forty parts of methyl methacrylate, three parts of tert.-butyl hydroperoxide, and one part of benzoyl peroxide were mixed and polymerized as described in Example 1. This polymer showed the following physical properties: It had a heat distortion temperature of more than 110° C., gave a Taber wiping abrasion test of three to four times that of polymethyl methacrylate and a Charpy impact strength, unnotched (A. S. T. M. D-256-41-T) of 1.27 ft. lbs., and had a flexural strength (A. S. T. M. D-48-39) of 11,700 p. s. i.

Example 4

Eighty parts of alloxyethyl methacrylate, twenty parts of ethyl methacrylate, four parts of tert.-butyl hydroperoxide, and one part of benzoyl peroxide were mixed and polymerized by heating for sixteen hours at 70° C. followed by three hours' heating at 150° C. The polymer was hard, clear, of good abrasion resistance, and gave a flexural strength value of 6600 p. s. i.

Example 5

There were mixed eighty parts of alloxyethyl methacrylate, twenty parts of lauryl methacrylate, four parts of tert.-butyl hydroperoxide, and one part of benzoyl peroxide. This mixture was polymerized by heating it for sixteen hours at 70° C., followed by three hours' heating at 150° C. The polymer was flexible and of fair abrasion resistance and gave a flexural strength value of 2600 p. s. i.

Example 6

Eighty parts of alloxyethyl methacrylate, twenty parts of methyl acrylate, four parts of tert.-butyl hydroperoxide, and one part of benzoyl peroxide were mixed and polymerized by heating for three and one-half hours at 72° C., followed by sixteen hours' heating at 135° C. The polymer was hard and of good abrasion resistance. It gave a flexural strength value of 6900 p. s. i.

Example 7

There were mixed ninety parts of alloxyethyl methacrylate, ten parts of ethyl acrylate, four parts of tert.-butyl hydroperoxide and one part of benzoyl peroxide. The mixture was polymerized by heating it for three hours at 72° C. and for sixteen hours at 110° C. The polymer was hard, clear, and of good abrasion resistance. It gave a flexural strength value of 6000 p. s. i.

Example 8

There were mixed ninety-five parts of alloxyethyl methacrylate, five parts of methacrylic acid, three parts of tert.-butyl hydroperoxide, and one part of benzoyl peroxide, and the mixture polymerized by heating it for sixteen hours at 68° C., followed by two hours' heating at 150° C. The polymer was hard, clear, and of good abrasion resistance. It gave a flexural strength value of 6800 p. s. i.

Example 9

Ninety parts of alloxyethyl methacrylate and ten parts of methyl methacrylate were mixed and then divided into four equal parts. To (a) was added 1% benzoyl peroxide, to (b) was added 1% benzoyl peroxide and 3% tert.-butyl hydroperoxide, to (c) was added 1% acetyl-benzoyl peroxide, and to (d) was added 1% acetyl-benzoyl peroxide and 3% tert.-butyl hydroperoxide. Each part was then poured into molds and polymerized by heating for three hours at 72° C., followed by sixteen hours at 130° C. Each resulted in a hard, clear polymer which gave the following values for flexural strength: (a) 2700 p. s. i., (b) 8000 p. s. i., (c) 2800 p. s. i., and (d) 7900 p. s. i.

Parts (a) and (c) were repeated with 4% of catalyst, with no better results.

Example 10

Eighty parts of alloxyethyl methacrylate, twenty parts of methyl methacrylate, four parts of tert.-butyl hydroperoxide, and one part of benzoyl peroxide were mixed and polymerized by heating for three hours at 65° C. The partial polymer was then separated from the mold, sawed into strips, and cured at elevated temperatures for various lengths of time, as follows:

| Curing Temperature and Time | Flexural Strength |
| --- | --- |
| No Curing | Too weak to test. |
| 16 hours at 100° C | 2700 p. s. i. |
| 16 hours at 135° C | 7300 p. s. i. |
| 16 hours at 150° C | 8650 p. s. i. |

Example 11

One hundred parts of alloxyethyl acrylate, four parts of tert.-butyl hydroperoxide, and one part of benzoyl peroxide were mixed and polymerized by heating for sixteen hours at 63° C., followed by one hour's heating at 140° C. The resulting polymer was hard and clear and of good abrasion resistance.

Example 12

There were mixed one hundred parts of methalloxyethyl methacrylate, one part tert.-butyl hydroperoxide, and one part of benzoyl peroxide, and the mixture polymerized by heating it for sixteen hours at 57° C., followed by eight hours at 145° C. The resulting polymer was hard and clear and of good abrasion resistance. It showed a flexural strength value of 5300 p. s. i.

Example 13

One hundred parts of monoallyl ether of diethylene glycolmonomethacrylate (alloxy-ethoxy-ethyl methacrylate), one part of tert.-butyl hydroperoxide, and one part of benzoyl peroxide were mixed and polymerized by heating for sixteen hours at 58° C., followed by eight hours' heating at 145° C. The resulting polymer was hard and clear and of good abrasion resistance. It showed a flexural strength value of 7000 p. s. i.

Example 14

One hundred parts of methallyl ether of diethylene glycol methacrylate (methalloxyethoxyethyl methacrylate), one part of tert.-butyl hydroperoxide, and one part of benzoyl peroxide were mixed and polymerized by heating for sixteen hours at 58° C., followed by eight hours at 145° C. The resulting polymer was hard and clear and of good abrasion resistance.

Example 15

There were mixed one hundred parts of monoallyl ether of propylene glycol-monomethacrylate, one part of tert.-butyl hydroperoxide, and one part of benzoyl peroxide. The mixture was polymerized by heating it for sixteen hours at 75° C. and for two hours at 130° C. The resulting polymer was hard and clear and of fairly good abrasion resistance.

Example 16

There were mixed one hundred parts of methallyl ether of propylene glycol methacrylate, one part of tert.-butyl hydroperoxide, and one part of benzoyl peroxide, and the mixture polymerized by heating it for sixteen hours at 58° C., followed by four hours' heating at 145° C. The resulting polymer was hard and clear and of good abrasion resistance.

Example 17

One hundred parts of allyl ether of propylene glycol-ethylene glycol methacrylate,

two parts of tert.-butyl hydroperoxide, and one part of benzoyl peroxide were mixed and polymerized by heating for sixteen hours at 65° C., followed by two hours at 150° C. The resulting polymer was hard and clear and of good abrasion resistance.

Example 18

There were mixed one hundred parts of alloxyethyl methacrylate, 0.5 part of caprylyl peroxide, and four parts of tert.-butyl hydroperoxide. The mixture was polymerized as in Example 1 by heating it for sixteen hours at 65° C., followed by two hours' heating at 150° C. The resulting crack-free polymer was hard and of good abrasion resistance. It showed a flexural strength value of 8250 p. s. i. Similar polymers of good abrasion resistance and flexural strength were obtained when the caprylyl peroxide was replaced by capryl or pelargonyl peroxides.

Example 19

Ninety parts of alloxyethyl methacrylate, one part of benzoyl peroxide, and three parts of tetralin peroxide were polymerized as in Example 1 by heating for four hours at 70° C., followed by sixteen hours at 125° C. The resulting polymer was hard and of excellent abrasion resistance. Similar results are obtained when di-tert.-butyl peroxide or tert.-butyl perbenzoate are substituted for tetralin peroxide or for tert.-butyl hydroperoxide in the above experiments.

The particular value of the polymeric materials prepared according to the method described above from the particular acrylic and methacrylic esters specified lies in the combination of surface resilience and abrasion resistance which is peculiar to these materials. Yet, with the hardness which supports the good abrasion resistance, there is a lack of the extreme brittleness which has heretofore accompanied a marked increase in hardness. Flexural strength is good, particularly for copolymers from the new acrylic esters of this invention. The new polymers, therefore, combine desirable properties which make them useful for transparent sheets for windshields, in automobiles, locomotives, airplanes, and the like, for ventilators in automobiles, cover plates on instruments, show cases, display enclosures, lenses in headlights, novelties, handles on handbags, objets d'art, etc.

We claim:

1. A process for preparing resinous acrylic polymers of high abrasion resistance which comprises combining an ester of the formula:

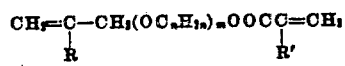

wherein R is a member of the class consisting of hydrogen and methyl groups, R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

2. A process for preparing resinous acrylic polymers of high abrasion resistance which comprises mixing an ester of the formula:

wherein R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

3. A process for preparing resinous acrylic polymers of high abrasion resistance which comprises mixing an ester of the formula:

$$CH_2=CH-CH_2(OC_nH_{2n})_mOOCCH=CH_2$$

wherein $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

4. A process for preparing resinous acrylic polymers of high abrasion resistance which comprises mixing an ester of the formula:

$$CH_2=CH-CH_2(OC_nH_{2n})_mOOCC(CH_3)=CH_2$$

wherein $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

5. A process for preparing resinous acrylic polymers of high abrasion resistance which comprises mixing an ester of the formula:

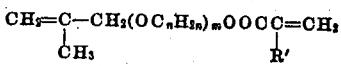

wherein R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

6. A process for preparing resinous acrylic polymers of high abrasion resistance which comprises mixing an ester of the formula:

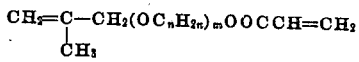

wherein $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

7. A process for preparing resinous acrylic polymers of high abrasion resistance which comprises mixing an ester of the formula:

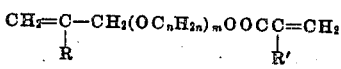

wherein R is a member of the class consisting of hydrogen and methyl groups, R' is a member of the class consisting of hydrogen and methyl groups, $C_nH_{2n}$ represents an alkylene chain of two carbon atoms between oxygen atoms, $n$ being an integer having a value from two to three, inclusive, and $m$ represents an integer from one to two, inclusive, benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

8. A process for preparing resinous acrylic polymers of high abrasion resistance which comprises mixing an ester of the formula:

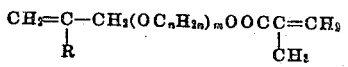

wherein R is a member of the class consisting of hydrogen and methyl groups, $C_nH_{2n}$ represents an alkylene chain of two carbon atoms between oxygen atoms, $n$ being an integer having a value from two to three, inclusive, and $m$ represents an integer from one to two, inclusive, benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

9. A process for preparing resinous acrylic polymers of high abrasion resistance which comprises mixing an ester of the formula:

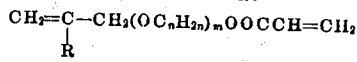

wherein R is a member of the class consisting of hydrogen and methyl groups, $C_nH_{2n}$ represents an alkylene chain of two carbon atoms between oxygen atoms, $n$ being an integer having a value from two to three, inclusive, and $m$ represents an integer from one to two, inclusive, benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

10. A process for preparing resinous acrylic polymers of high abrasion resistance which comprises mixing an ester of the formula:

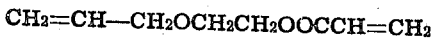

benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

11. A process for preparing resinous acrylic polymers of high abrasion resistance which comprises mixing an ester of the formula:

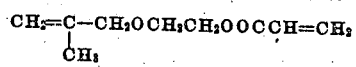

benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

12. A process for preparing resinous acrylic polymers of high abrasion resistance which comprises mixing an ester of the formula:

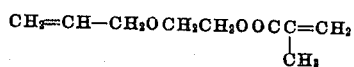

benzoyl peroxide, and tert.-butyl hydroperoxide, heating the resulting mixture at a temperature between about 25° C. and about 75° C. until an insoluble, at least semi-rigid product results, and heating said product at a temperature from about 120° C. to about 180° C. until a tough, abrasion-resistant product is formed.

13. A process for preparing acrylic resins of high abrasion resistance which comprises combining with a mixture of copolymerizable ethenoid monomers in which there is a major proportion of a monomer of the formula:

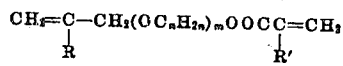

wherein R is a member of the class consisting of hydrogen and methyl groups, R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting combination at a temperature between about 25° C. and about 75° C. until an insoluble, at least semi-rigid product results, and heating said product at a temperature from about 120° C. to about 180° C. until a tough, abrasion-resistant product is formed.

14. A process for preparing acrylic resins of high abrasion resistance which comprises combining with a mixture of copolymerizable ethenoid monomers in which there is a major proportion of a monomer of the formula:

wherein R' is a member of the class consisting of hydrogen and methyl groups, an organic peroxide which is effective as a polymerization catalyst below 100° C., and an organic peroxide which is effective as a polymerization catalyst above 120° C. and is not rapidly decomposed when boiled in toluene, heating the resulting combination at a temperature between about 25° C. and about 75° C. until an insoluble, at least semi-rigid product results, and heating said product at a temperature from about 120° C. to about 180° C. until a tough, abrasion-resistant product is formed.

15. A process for preparing acrylic resins of high abrasion resistance which comprises combining with a mixture of copolymerizable ethenoid monomers in which there is a major proportion of a monomer of the formula:

an organic peroxide which is effective as a polymerization catalyst below 100° C., and an organic peroxide which is effective as a polymerization catalyst above 120° C. and is not rapidly decomposed when boiled in toluene, heating the resulting combination at a temperature between about 25° C. and about 75° C. until an insoluble, at least semi-rigid product results, and heating said product at a temperature from about 120° C. to about 180° C. until a tough, abrasion-resistant product is formed.

16. A process for preparing acrylic resins of high abrasion resistance which comprises combining with a mixture of copolymerizable ethenoid monomers in which there is a major proportion of a monomer of the formula:

benzoyl peroxide, and tert.-butyl hydroperoxide, heating the resulting combination at a temperature between about 25° C. and about 75° C. until an insoluble, at least semi-rigid product results, and heating said product at a temperature from about 120° C. to about 180° C. until a tough, abrasion-resistant product is formed.

17. A process for preparing acrylic resins of high abrasion resistance which comprises combining with a mixture of methyl methacrylate and a major proportion of a compound of the formula:

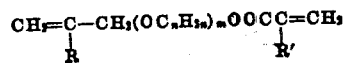

wherein R is a member of the class consisting of hydrogen and methyl groups, R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, an organic peroxide which is effective as a polymerization catalyst below 100° C., and an organic peroxide which is effective as a polymerization catalyst above 120° C. and is not rapidly decomposed when boiled in toluene, heating the resulting combination at a temperature between about 25° C. and about 75° C. until an insoluble, at least semi-rigid product results, and heating said product at a temperature from about 120° C. to about 180° C. until a tough, abrasion-resistant product is formed.

18. A process for preparing acrylic resins of high abrasion resistance which comprises combining with a mixture of methyl methacrylate and a major proportion of a compound of the formula:

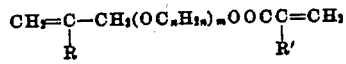

wherein R is a member of the class consisting of hydrogen and methyl groups, R' is a member of the class consisting of hydrogen and methyl groups, $C_nH_{2n}$ represents an alkylene chain of two carbon atoms between oxygen atoms, $n$ being an integer having a value of two to three, inclusive, and $m$ represents an integer from one to two, inclusive, benzoyl peroxide, and tert.-butyl hydroperoxide, heating the resulting combination at a temperature between about 25° C. and about 75° C. until an insoluble, at least semi-rigid product results, and heating said product at a temperature from about 120° C. to about 180° C. until a tough, abrasion-resistant product is formed.

19. The tough, abrasion-resistant resinous material obtained by the process of claim 1.
20. The tough, abrasion-resistant resinous material obtained by the process of claim 2.
21. The tough, abrasion-resistant resinous material obtained by the process of claim 5.
22. The tough, abrasion-resistant resinous material obtained by the process of claim 10.
23. The tough, abrasion-resistant resinous material obtained by the process of claim 11.
24. The tough, abrasion-resistant resinous material obtained by the process of claim 12.
25. The tough, abrasion-resistant resinous material obtained by the process of claim 13.
26. The tough, abrasion-resistant resinous material obtained by the process of claim 15.
27. The tough, abrasion-resistant resinous material obtained by the process of claim 17.

EDWIN H. KROEKER.
WILLARD J. CROXALL.

REFERENCES CITED

The following references are of record in the file of this patent:

UNITED STATES PATENTS

| Number | Name | Date |
|---|---|---|
| 2,370,562 | Meunier | Feb. 27, 1945 |
| 2,409,633 | Kropa | Oct. 22, 1946 |